United States Patent
Marletto

(10) Patent No.: US 7,757,845 B2
(45) Date of Patent: Jul. 20, 2010

(54) KIT COMPRISING AN ICE-CREAM CONE HOLDER AND A GIFT ITEM

(75) Inventor: Luca Marletto, Capriva del Friuli (IT)

(73) Assignee: Marpe S.R.L., Capriva del Friuli (GO) (IT)

( * ) Notice: Subject to any disclaimer, the term of this patent is extended or adjusted under 35 U.S.C. 154(b) by 982 days.

(21) Appl. No.: 11/475,451

(22) Filed: Jun. 27, 2006

(65) Prior Publication Data

US 2007/0000567 A1    Jan. 4, 2007

(30) Foreign Application Priority Data

Jun. 30, 2005    (EP) .................................. 05014277

(51) Int. Cl.
B65D 77/00    (2006.01)
(52) U.S. Cl. ....................... 206/216; 426/132
(58) Field of Classification Search ................ 206/216, 206/217, 223, 549, 37, 38, 457, 577; 141/86; 220/737, 738, 741, 742; 426/132, 420, 138
See application file for complete search history.

(56) References Cited

U.S. PATENT DOCUMENTS

| 3,351,258 A |  | 11/1967 | Evantash |  |
|---|---|---|---|---|
| 3,741,379 A | * | 6/1973 | Kappler et al. | 206/457 |
| 4,079,858 A |  | 3/1978 | Fuss |  |
| 5,456,351 A | * | 10/1995 | Johnson | 206/217 |
| 5,794,771 A | * | 8/1998 | Krawec et al. | 206/223 |
| 6,026,952 A | * | 2/2000 | Brooks | 206/216 |
| 6,092,658 A | * | 7/2000 | Pietrafesa | 206/457 |
| 6,116,500 A | * | 9/2000 | Cahill | 206/216 |
| 6,182,854 B1 |  | 2/2001 | Jimenez et al. |  |
| 6,237,646 B1 |  | 5/2001 | Rodman |  |

FOREIGN PATENT DOCUMENTS

| EP | 0 709 307 | 5/1996 |
|---|---|---|
| EP | 1 639 900 | 3/2006 |
| FR | 2 827 584 | 1/2003 |

\* cited by examiner

*Primary Examiner*—Laun K Bui
(74) *Attorney, Agent, or Firm*—Notaro, Michalos & Zaccaria P.C.

(57) ABSTRACT

A cone holder comprises an open hollow body a gift item for supporting an ice-cream cone a gift item partially inserted therein. Advantageously the hollow body a gift item is shaped in such a manner as to define a housing a gift item in which a gift item a gift item is removably received in a position in which it does not interfere with the portion of the ice-cream cone inserted in the hollow body a gift item.

7 Claims, 1 Drawing Sheet

KIT COMPRISING AN ICE-CREAM CONE HOLDER AND A GIFT ITEM

The present invention relates to a kit comprising an ice-cream cone holder and a gift item, the cone holder having an open hollow body suitable for supporting an ice-cream cone partially inserted therein.

Such cone holders are generally disposable, i.e. intended for single use, in combination with the sale of edible substances in cones, such as home made ice-cream, ice-cream cakes, yogurt, whipped cream, mousse, creams, and the like. It is particularly known to use cone holders for receiving and supporting wafer ice-cream cones.

These cone holders are mainly used to isolate the ice-cream cone from contact with the hands of those who serve the ice-cream or those who consume it, to keep it from being contaminated. In short, the ice-cream cone is introduced in the cone holder that is designed to be held in the hand of a user.

Cone holders are generally configured to have a flare next to the top opening, through which the cone is introduced, for collecting any melted ice-cream drips, thereby preventing them from falling to the ground or on the ice-cream consumer's body.

The word "ice-cream cone" as used herein is intended to define any kind of edible support for an ice-cream, particularly a wafer cone, whether this support actually has a conic shape or not. The word "cone holder" as used herein is intended to define the element for supporting an ice-cream cone partially inserted herein.

In the sale, of home-made ice-cream, as well as other retail goods, a need is felt of possibly accompanying the ice-cream cone with a gift item, e.g. a gift, an accessory, or the like. This need is not easily fulfilled in the sale of home-made ice-cream in cones.

This mainly depends on that the lack of a packaging for containing both the ice-cream cone and the accompanying gift item, poses the question on how the gift item may be associated to the ice-cream cone. Particularly, one of the main issues to be addressed is to assure that the gift item does not come out of the ice-cream cone during transportation thereof.

Another non negligible problem is the size increase caused by the presence of the gift item. It shall be noted that, before use, ice-cream cones are stacked in a mutually inserted relationship, in such a manner as to reduce the overall dimensions of the ice-cream cones. Apparently, the presence of a gift item outside the ice-cream cone forcibly involves the impossibility of stacking multiple cones in a mutually inserted relationship.

It shall be further noted that the presence of cone holders constructed according to prior art, although providing various advantages, is a further hindrance to the fulfillment of the above need, as the presence of the gift item or gift to be associated to the cone or cone holder causes a further size increase.

Therefore, this invention is based on the issue of conceiving and providing a kit comprising an ice-cream cone holder and a gift item, allowing to fulfill the above need, while obviating the above prior art drawbacks. This problem is solved by the provision of a kit according to claim 1.

Further characteristics of the kit according to the invention, as well as the advantages derived therefrom will be apparent from the following description of one preferred embodiment thereof, which is given by way of illustration and without limitation with reference to the accompanying figures, in which.

Referring to the accompanying figures, a kit according to the invention and comprising an ice-cream cone holder 1 and a gift item 11 is shown.

Figure 2:
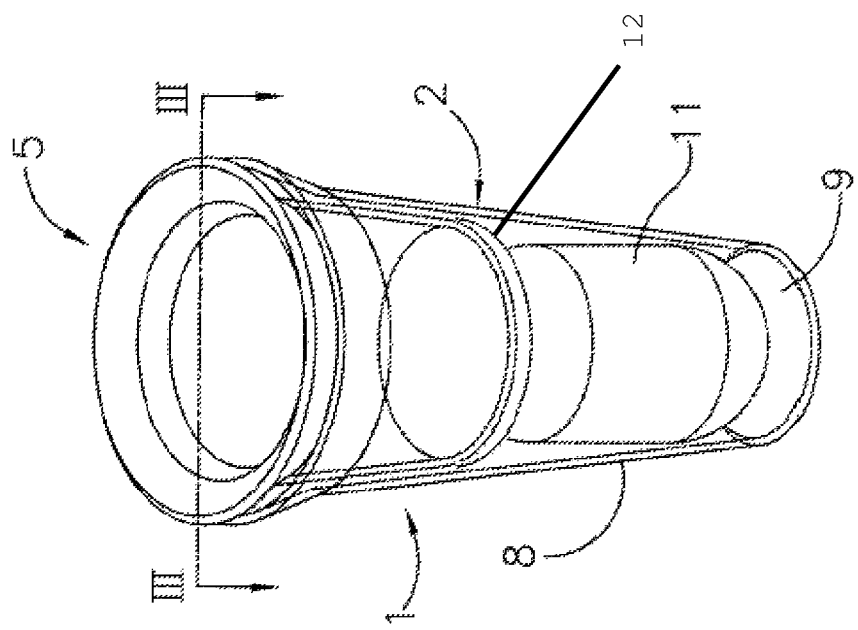
FIG. 2 is a schematic view of the kit of FIG. 1 in the assembled condition.
Figure 1:
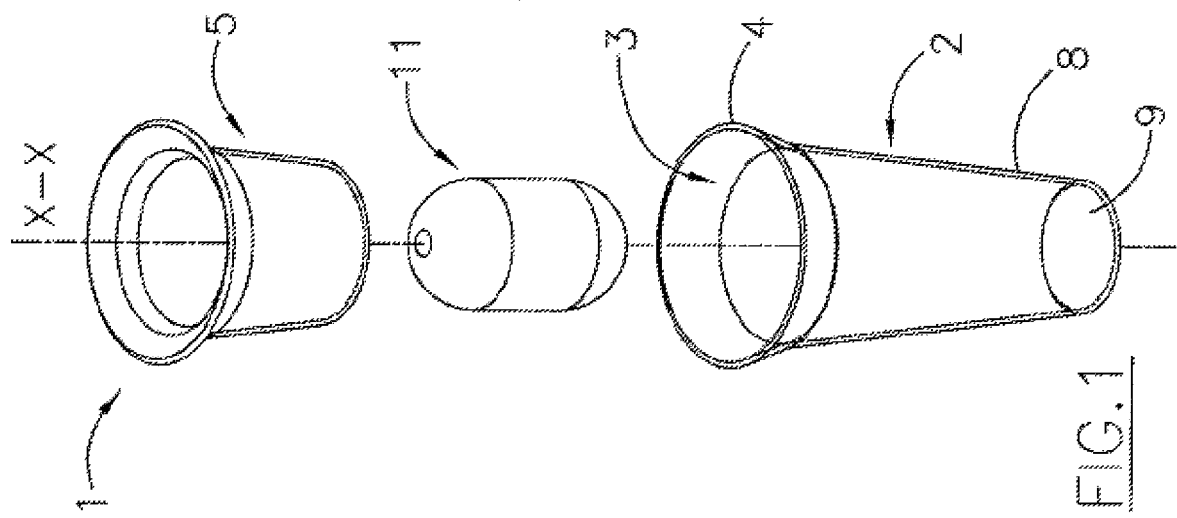
FIG. 1 is a schematic exploded view of a kit according to this invention comprising an ice-cream cone holder and a gift item housed therein and a cone to be supported.

The cone holder 1 comprises an open hollow body 2 for supporting an ice-cream cone 5 partially inserted therein, as shown in FIG. 2.

Preferably the hollow body 2 has an essentially truncated cone shape extending in a prevailing axial direction X-X, from a bottom wall 9 to a top opening 3 through which the ice-cream cone 5 may be partially inserted through the hollow body 2 of the cone holder 1 to be supported thereby. Therefore, the hollow body 2 has a bottom 9 wherefrom a side wall 8 extends, the letter having the section of a circular cone diverging toward the free top end with the top opening 3. At said free top end, the side wall 8 has a flare 4, i.e. a more tapered divergent conic portion, which defines a widened portion of the hollow body, for collecting any melted ice-cream drips.

The ice-cream cone 5 is a commonly available edible cone, e.g. a cone of molded wafer. The ice-cream cone may be of various shapes and sizes, depending on the manufacturer. In the example as shown in the figures, the ice-cream cone 5 has the shape of a truncated cone.

In this respect, it shall be noted that the cone holder has such shapes and sizes as to fit the type of ice-cream cones to be supported. Hence, the cone holder of the present invention may also have shapes and sizes other than those of the cone holder 1 as shown in the figures.

The cone holder 2 is made of a material suitable for direct contact with food products, e.g. a plastic material such as polystyrene (PS) or a polyethylene-coated cardboard, to avoid any hygienic or sanitary problem arising from any possible contact between the ice-cream cone 5 and the cone holder.

Figure 3:
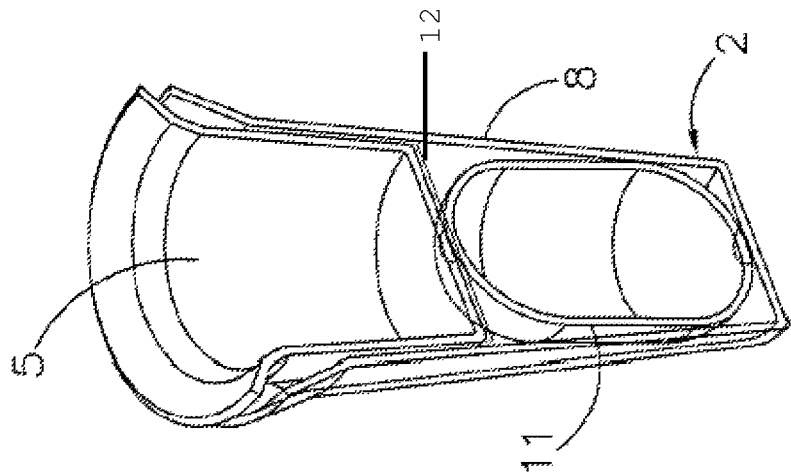
FIG. 3 is a schematic sectional view taken along line III-III of FIG. 2.

In accordance with an advantageous aspect, the hollow body 2 of the cone holder 1 is conformed in such a manner as to define a housing 10 in which a gift item 11 is removably received without interfering with the portion of the ice-cream cone 5 in the hollow body 2, as shown in FIGS. 2 and 3.

Preferably, the housing 10 is defined at the lower end of this hollow body 2, in the proximity of its bottom wall 9. In fact, the hollow body 2 comprises an upper portion for receiving the portion of the ice-cream cone 5 to be introduced in the hollow body, and an underlying lower portion, for containing the gift item in such a manner that no interference exists between the ice-cream cone 5 and the gift item 11. To achieve this result, the cone holder 1 has a hollow body 2 whose axial extension is longer than that of the portion of the ice-cream cone 5 to be housed therein.

In the example that is shown in the figures, the gift item 11 to be contained in the housing 10 has the form of an essentially egg-shaped capsule acting as a container for other products/gift items.

It will be appreciated that the egg-shaped capsule does not constitute a preferred embodiment, any other gift item being receivable in the housing 10, provided it has such a shape and a size as to allow its retention therein.

In this respect, it shall be noted that different shapes and sizes of the cone holder 1 may be provided, to comply with the size of the gift items to be accommodated therein.

It will be understood that the gift item 11 to be introduced in the housing 10 may be of any nature and have any purpose, e.g. a food product, a candy or else, such as a gift, a toy, or picture cards.

Advantageously, the use of such a capsule, particularly of a capsule made of a food-grade plastic material, prevents any hygienic or sanitary problem associated to the contact possibly occurring between the ice-cream cone 5 and the gift item.

The capsule 11 may be introduced in the housing 10 by forcing it therein. To this purpose, the cone holder 2 may have engagement means such as a plurality of retaining teeth or tabs (not shown), for removably holding the capsule in the housing 10 and preventing it from being accidentally released therefrom.

In accordance with a preferred embodiment, the top opening 3 of the hollow body may be closed by a removable film (not shown for the sake of simplicity). To allow stacking of multiple cone holders in a mutually inserted relationship, the removable film is not stretched but has a bag-like shape, to fit the cavity of the hollow body 2 by adhering against it.

The film is used to prevent the gift item 11 from coming out of the hollow body 2, for instance during transportation or handling of the inventive cone holders.

According to a different embodiment, the film may be replaced by a removable partition diaphragm 12, e.g. a plastic or aluminum film, located in such a position as to separate the lower and upper portions of the hollow body 2.

In use, the kit according to the present invention is sold to the ice-cream buyer/consumer in the condition as shown in FIG. 2, , i.e. with an ice-cream cone 5 partially inserted in the hollow body 2 of the holder cone 1 and supported thereby, and with the gift item 11 housed in the housing 10. The ice-cream cone 5 is obviously filled with an appropriate amount of ice-cream (not shown).

Before or after eating the ice-cream, the user/consumer may draw the gift item 11 out of its housing 10 by simply extracting the second body 5 from the first body 2, and by drawing out the gift item 11 after removing any removable diaphragm or film over it. This may also be previously removed by the ice-cream dealer, before introducing the ice-cream cone in the cone holder.

It shall be noted that the kit according to the present invention allows a gift item to be accommodated in the cone holder without involving any space problem and without preventing the stackability of cone holders in mutually inserted relationship.

The above description clearly shows that the kit according to the invention meets the above need while obviating the above prior art drawbacks.

It shall be noted that by placing the gift item 11 inside the first body 2, the gift item is safely prevented from coming out of the cone holder.

The cone holder may be fabricated by using well-known manufacturing processes, e.g. by injection or molding for plastic cone holders or other processes for polyethylene-coated cardboard cone holders., Those skilled in the art will obviously appreciate that a number of changes and variants may be made to the cone holder of the kit as described hereinbefore, without departure from the scope of the invention, as defined in the following claims.

The invention claimed is:

1. A kit comprising a cone holder and a gift item, wherein:
   the cone holder comprises an open hollow body shaped in such a manner as to define a housing in which the gift item is removably housed;
   said gift item comprising a substantially egg-shaped container acting as a container for an at least one additional gift item;
   said kit comprising an edible ice-cream cone partially inserted in said hollow body to be supported thereby; and
   said gift item being removably housed in said hollow body in a position in which it does not interfere with said edible ice-cream cone.

2. A kit as claimed in claim 1, wherein said hollow body has a top opening through which said edible ice-cream cone may be partially inserted to be supported thereby, said housing being defined at the lower end of said hollow body.

3. A kit as claimed in claim 1, wherein said hollow body extends from a bottom wall to a top opening through which said edible ice-cream cone may be partially inserted to be supported thereby, said housing being defined in the proximity of its bottom wall.

4. A kit as claimed in claim 2, wherein said gift item is introduced in said housing of said hollow body by forcing it therein through said top opening.

5. A kit as claimed in claim 1, wherein said hollow body has an essentially truncated cone shape extending in a prevailing axial direction.

6. A kit as claimed in claim 1, wherein said hollow body has an upper portion for containing the portion of said edible ice-cream cone inserted in the hollow body and a lower portion for containing said gift item.

7. A kit as claimed in claim 6, wherein said lower portion and said upper portion of said hollow body are separated by a removable partition diaphragm.

\* \* \* \* \*